(12) United States Patent
Medford

(10) Patent No.: US 7,488,028 B2
(45) Date of Patent: Feb. 10, 2009

(54) SYSTEM FOR READILY CUSTOMIZING AND INTERCHANGING VEHICLE BODY PARTS

(75) Inventor: Donny Medford, 3653 Timberglen Rd., Apt. 1012, Dallas, TX (US) 75287

(73) Assignee: Donny Medford, Carrollton, TX (US)

( * ) Notice: Subject to any disclaimer, the term of this patent is extended or adjusted under 35 U.S.C. 154(b) by 0 days.

(21) Appl. No.: 11/462,544

(22) Filed: Aug. 4, 2006

(65) Prior Publication Data
US 2007/0029834 A1 Feb. 8, 2007

Related U.S. Application Data

(60) Provisional application No. 60/705,393, filed on Aug. 4, 2005.

(51) Int. Cl.
*B62D 39/00* (2006.01)

(52) U.S. Cl. ............... 296/136.07; 296/136.01; 296/136.08

(58) Field of Classification Search ............ 296/136.01, 296/136.07, 136.08, 136.1, 136.13
See application file for complete search history.

(56) References Cited

U.S. PATENT DOCUMENTS

| 5,879,045 | A | 3/1999 | Logan |
| 5,931,522 | A | 8/1999 | Roskey |
| 5,984,401 | A | 11/1999 | Hannah |
| 6,595,575 | B2 | 7/2003 | Morris |
| 6,932,411 | B2 * | 8/2005 | McKinney ............... 296/13.01 |
| 7,100,695 | B2 * | 9/2006 | Reitz ......................... 166/372 |

* cited by examiner

*Primary Examiner*—Lori L Lyjak
(74) *Attorney, Agent, or Firm*—Michael A. O'Neil

(57) ABSTRACT

The present invention is a system for customizing and accessorizing a vehicle to enhance the appearance of most any domestic or foreign car, truck or sports utility vehicle, including a lowered ground effect. The component parts are durable enough to provide limited protection for the vehicle from the elements, washable, and available in a variety of shapes and colors. The system may be quickly installed, removed, or interchanged via hooks, buckles, straps and hook and loop fasteners, all without the necessity of tools.

1 Claim, 4 Drawing Sheets

SYSTEM FOR READILY CUSTOMIZING AND INTERCHANGING VEHICLE BODY PARTS

CITATION TO PRIOR APPLICATION

This application claims the benefit of U.S. Provisional Application No. 60/705,393, filed on Aug. 4, 2005.

BACKGROUND OF THE INVENTION

1. Field of the Invention

The present invention is directed toward a system for readily interchanging body parts for customizing the appearance of most any vehicle. In particular, the present system provides a number of pieces, which can be used singularly or in conjunction with one another by the individual user of a particular vehicle to create a custom look each and every time the vehicle is operated.

2. Background Information

America's $250 billion automotive aftermarket industry includes a number of popular aftermarket products for domestic and foreign cars, pickup trucks, and sport utility vehicles. From wheel covers to stylized body parts, it is clear that Americans enjoy the ability to express their individuality by the customization of their automobiles. In fact, aftermarket vehicle body parts themselves are readily and commercially available for various applications.

The prior art for aftermarket-type vehicle body parts includes U.S. Pat. Nos. 6,595,575, 5,984,401, 5,931,522 and 5,879,045 among others. While these devices fulfill their respective, particularly claimed objectives and requirements, the aforementioned prior art fails to disclose a system for readily changing and customizing a vehicle, as claimed in the present invention.

First U.S. Pat. No. 6,595,575 issued to Morris on Jul. 22, 2003 and entitled "Protective and Decorative Vehicle Body Panels," is an aftermarket kit comprised of protective and decorative vehicle body panels for attachment to existing vehicle body structures. Although this kit works well for permanent or semi-permanent attachment of protective and aesthetic body panels, Morris does not provide either a lowered-ground effect or customization that is readily convertible or changeable on a day to day basis through easily attachable and detachable parts.

Similarly, U.S. Pat. No. 5,984,401 issued to Hannah, provides an aftermarket kit comprising protective, metallic paneling for the entire exterior surface of the vehicle. Although, it appears that Hannah works well for its intended purpose, protection of a vehicle in off-road conditions, Hannah also does not provide for an aesthetic ground lowered effect that can be removed, replaced and interchanged on a daily basis.

A third relevant piece of prior art is U.S. Pat. No. 5,931,522 issued to Roskey. Roskey provides for a kit comprised of flexible, magnetic protective members that can be cut to size and placed on the existing paneling of a vehicle. Again, no provision is made for a ground lowering effect that can be easily interchanged or removed on a daily basis.

Finally, U.S. Pat. No. 5,879,045, issued to Logan on Mar. 9, 1999 and entitled "Vehicle Body and Fender Extension System," is a vehicle extension system that permanently mounts on the fenders and rocker panels of a vehicle. However, unlike the proposed invention, the application of Logan provides extensions merely to fenders and rocker panels of a vehicle in a permanently affixed configuration, which clearly would not allow for readily interchangeable customization of any particular vehicle.

In view of the limitations associated with the prior art, a substantial need exists for an inexpensive but durable system of vehicle body parts that can alter the appearance of a vehicle, including a lowered ground effect, and that can be easily installed, removed, or replaced whenever an altered customization is desired. The present invention, through a novel combination of component parts, provides such a system.

SUMMARY OF THE INVENTION

The general purpose of the present invention, which will be described subsequently in greater detail, is to provide aftermarket, vehicle body parts that can customize the appearance of most any foreign or domestic vehicle, while retaining the distinctive aspect of being readily installed, removed or replaced quickly and easily.

In view of the foregoing, it is an object of the present invention to provide a system for customizing the appearance of a vehicle, including but not limited to a lowered ground effect.

It is another object of the present invention to provide a system for customizing the appearance of a vehicle that is durable enough to provide limited protection of the vehicle.

It is another object of the present invention to provide a system for customizing the appearance of a vehicle that is easily installed to most any vehicle.

It is another object of the present invention to provide a system for customizing the appearance of a vehicle that is inexpensive to purchase and maintain.

It is another object of the present invention to provide a system for customizing the appearance of a vehicle that is easily cleaned.

It is another object of the present invention to provide a system for customizing the appearance of a vehicle that can be produced and purchased in a variety of materials, colors, and surface effects.

It is another object of the present invention to provide a system for customizing the appearance of a vehicle that may be used with most domestic and foreign car, pickup truck, and sport utility vehicles.

It is another object of the present invention to provide a system for customizing the appearance of a vehicle that may be readily installed via the use of hooks, buckles, and/or hook and loop fasteners.

In satisfaction of these and related objectives, the present invention provides a system of aftermarket, vehicle body parts that may be conveniently customized, easily installed, easily removed, easily replaced, easily washed, and durable in application. The preferred embodiment of the present invention includes a plurality of component pieces made of a durable, hard plastic material wrapped in leather or other aesthetic material or fabric. The system optionally consists of a front fascia, side skirts, a gas cap cover, a rear bumper extension, a rear spoiler wing, and side mirror covers. Furthermore, each of the aforementioned parts may be easily installed or removed via a combination of hooks, straps, buckles, and hook and loop fasteners as subsequently detailed. Consequently, the result of the foregoing is a system for easily customizing a vehicle, including, but not limited to a ground lowered effect.

BRIEF DESCRIPTION OF THE DRAWINGS

Applicant's invention may be further understood from a description of the accompanying drawings, wherein unless otherwise specified, like referenced numerals are intended to depict like components in the various views.

DETAILED DESCRIPTION OF THE PREFERRED EMBODIMENT

Figure 1:
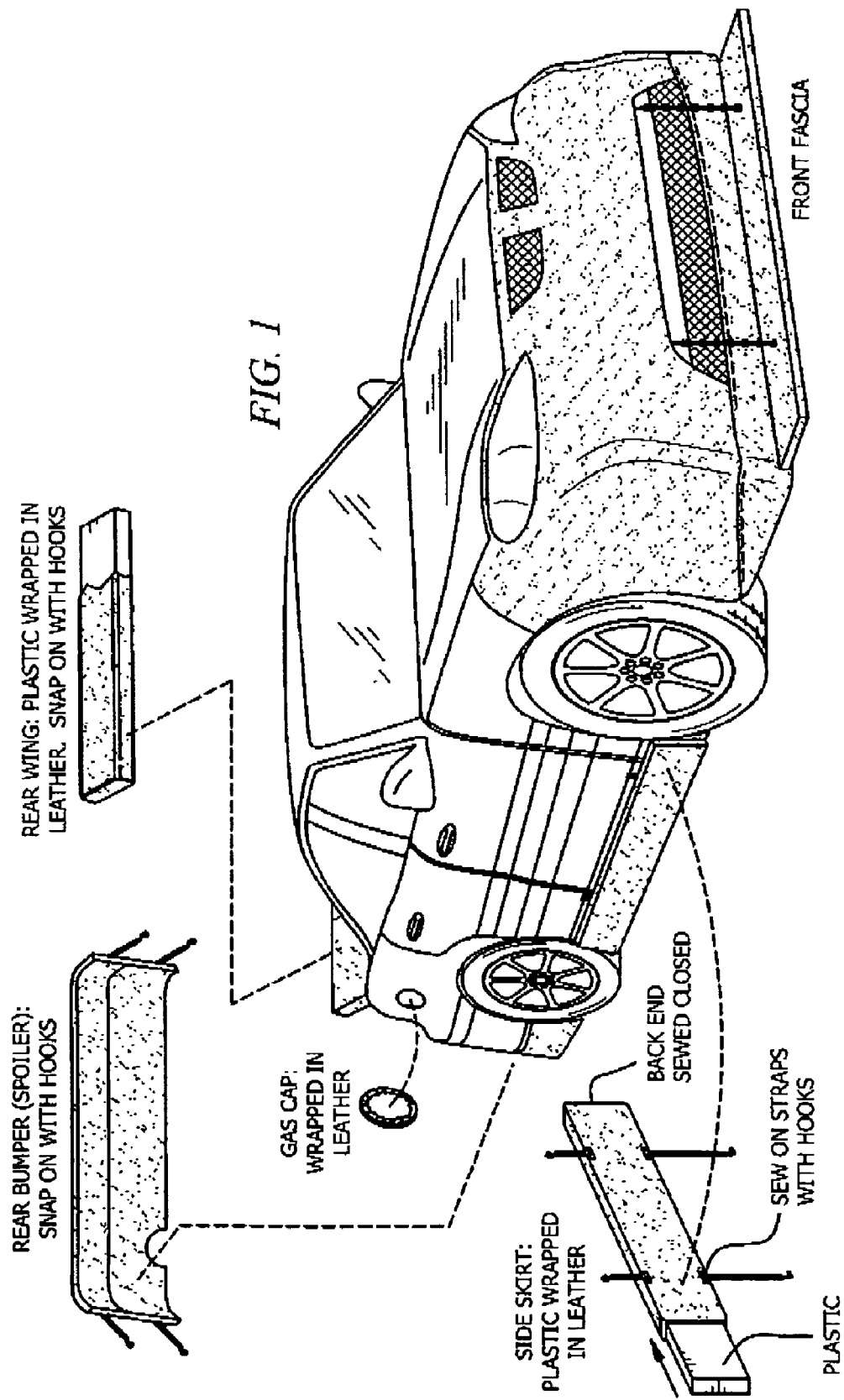
FIG. 1 is a perspective view of a vehicle with the system of the present invention installed.
Figure 2:
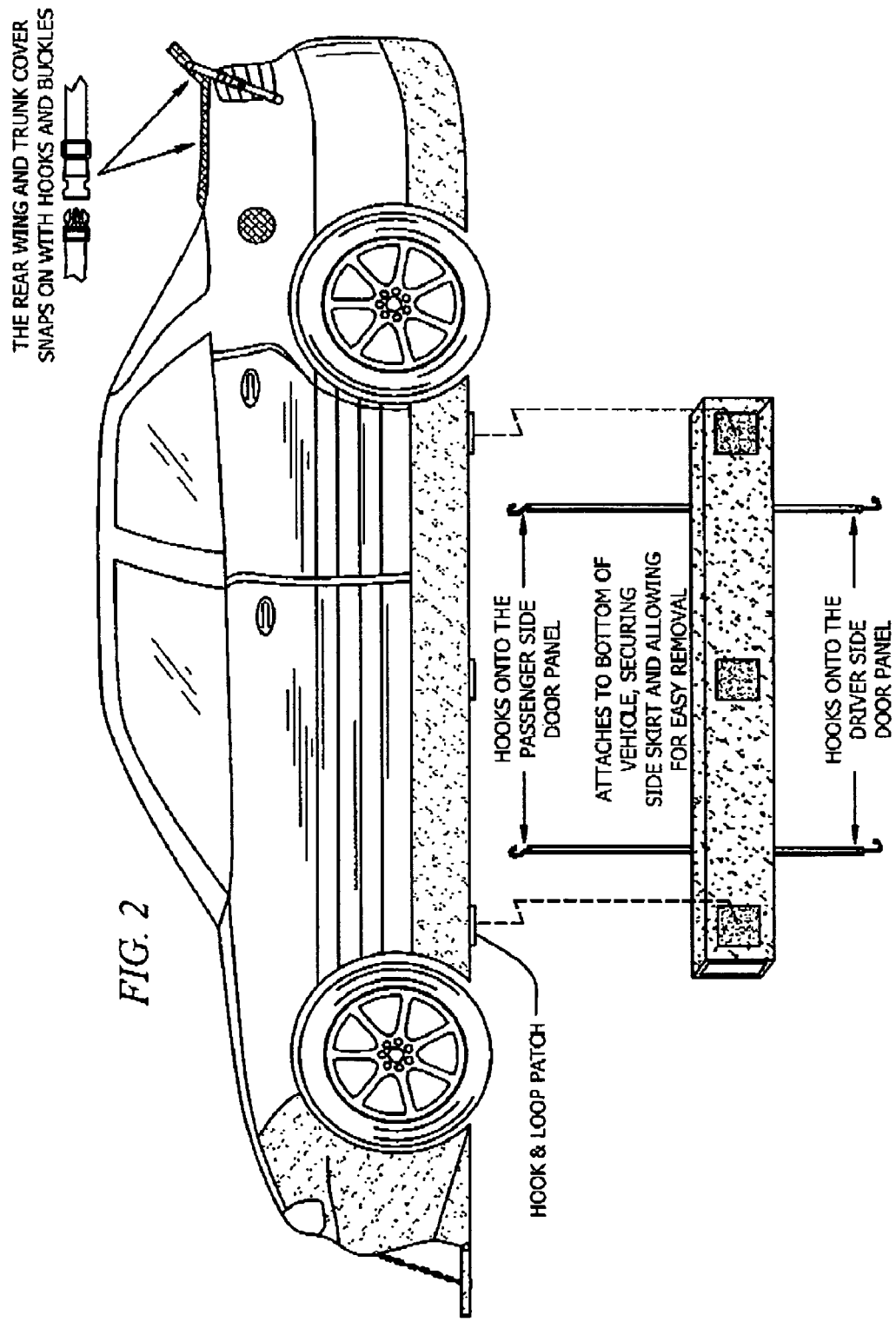
FIG. 2 is a side view of the vehicle of FIG. 1 with the system of the present invention installed.

Referring to FIG. 1, a system for easily, readily, and interchangeably customizing the look of a vehicle is shown and generally designated by numeral 10. In the preferred embodiment, the system consist of a front fascia member (12), two side skirt members (14), a rear bumper member (16), a gas cap cover (18), a rear spoiler wing member (20), and side mirror covers (22). As previously mentioned all members are removably attachable via a system of hooks, straps, clamps, buckles, and hook and loop fasteners.

Figure 4:
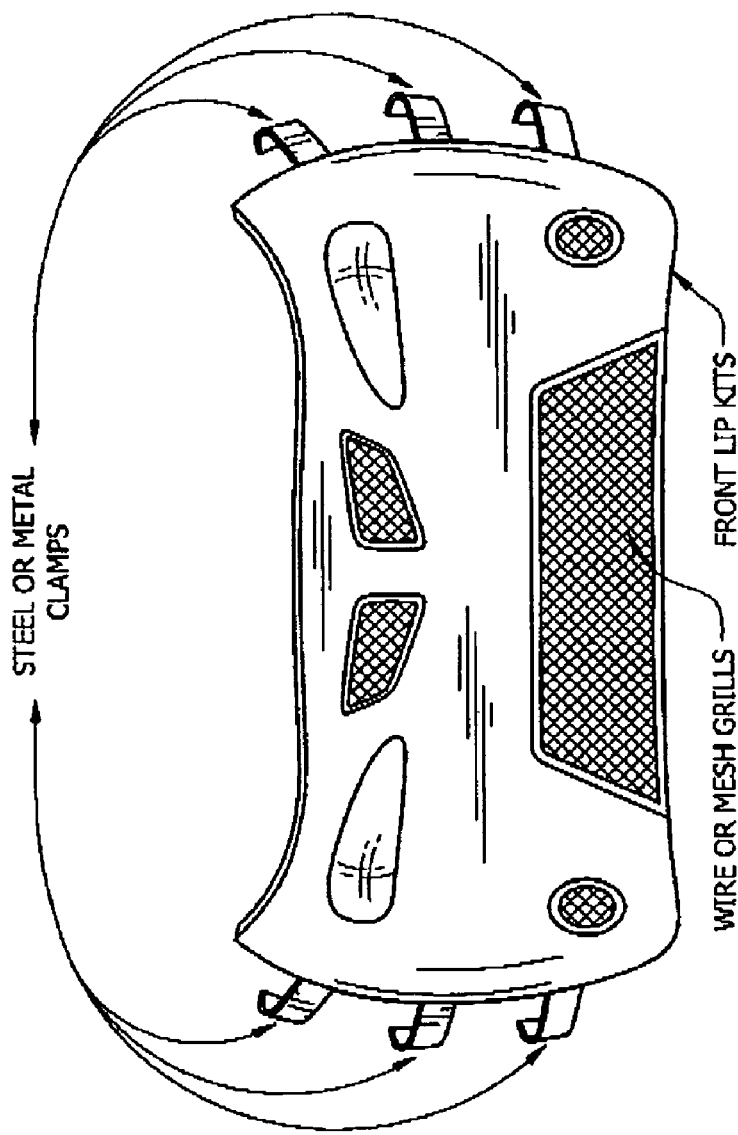
FIG. 4 is a front plan view of the front fascia component of the present invention.

Referring primarily FIG. 4, front fascia member (12) is shown. Front fascia member (12) is comprised of conforming member (24) attached to fascia lowering member (26). Fascia lowering member (26), in turn, is comprised of front inner solid member (28) surrounded by front outer covering member (30). Inner solid member (28) is preferably a molded or extruded plastic member, such as polyurethane or even fiberglass. Outer covering member (30) is preferably a leather or synthetic fabric material that is waterproof and can be manufactured in a variety of colors or textures. Finally, front fascia member (12) is attached to the front fascia of an existing vehicle via attachment members (32). In the preferred embodiment, vehicle attachment members are metallic clamps and/or hooks.

Figure 3:
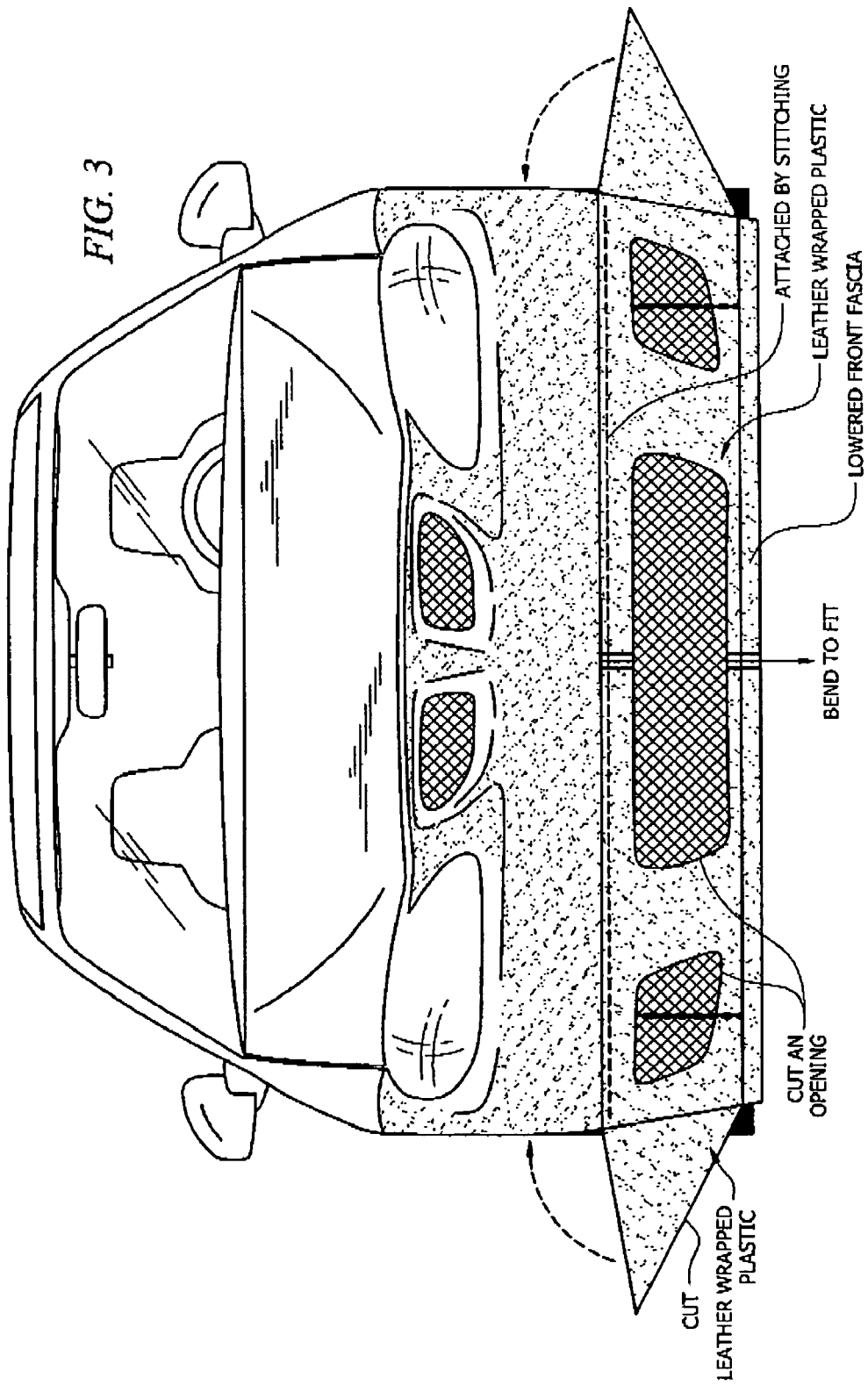
FIG. 3 is a perspective view of a side skirt component of the present invention.

Next, referring primarily to FIG. 3, side skirt member (14) is shown. In the preferred embodiment, side skirt member (14) is comprised of side inner solid member (34) surrounded by side outer covering member (36). Side inner solid member (34) and outer covering member (36) are comprised of materials similar to, or the same as, front inner solid member (28) and front outer covering member (30). Finally, side skirt members (14) are attached to the existing vehicle structure via hook and loop fastening members (38) and hook or clamp fastening members (40) extending from side skirt member (14) via strap members (46).

Referring back to FIG. 1, rear bumper member (16) is shown. Rear bumper member (16) is similarly configured to front fascia member (12) having an inner solid member (56) covered by a rear outer covering (42) consisting of the same materials as previously described for front fascia member (12). In addition, the rear attachment means (44) is preferably comprised of metallic hooks and/or clamps.

Still referring to FIG. 1, a spoiler wing member (20) is shown. Rear spoiler wing (20) is comprised of wing inner member (48) and wing outer covering (50), which are comprised of the same materials as previously described for front fascia member (12). Additionally, spoiler wing (20) is removably attached to an existing vehicle via fastening means (52), such as hook and loop fasteners or metallic clamps, hooks or buckles.

Finally, gas cap cover (18) and side mirror covers (22) are shown in FIG. 1. Each of these members is comprised of the same material described in front fascia outer cover material (30). Additionally, each is removably attached to an existing vehicle via fastening means (54), such as hook and loop fasteners, or metallic clamps, hooks, or buckles.

Although the invention has been described with reference to specific embodiments, this description is not meant to be construed in a limited sense. Various modifications of the disclosed embodiments, as well as alternative embodiments of the inventions will become apparent to persons skilled in the art upon reference to the description of the invention. It is, therefore, contemplated that the appended claims will cover such modifications that fall within the scope of the invention.

I claim:

1. A system for customizing a motor vehicle, comprising:

a front fascia member, said front fascia member having a front inner solid core member and a front flexible outer covering member, said front inner solid core member being comprised of a molded or extruded plastic member, said front flexible outer covering member being comprised of a textured synthetic material available in a plurality of colors, said synthetic material being waterproof, said front fascia member being configured for removable attachment with the front fascia of an existing motor vehicle via a front attachment means, said front attachment means being comprised of hooks, clamps and hook and loop fasteners;

a side skirt member, said side skirt member having a side inner solid core member and a side flexible outer covering member, said side inner solid core member being comprised of a molded or extruded plastic member, said side flexible outer covering member being comprised of a textured synthetic material available in a plurality of colors, said synthetic material being waterproof; said side skirt member being configured for removable attachment with the side rocker panels of an existing motor vehicle via a side attachment means, said side attachment means being comprised of hooks, clamps, hook and loop fasteners, and strap members;

a rear bumper extension member, said rear bumper extension member having a rear inner solid core member and a rear flexible outer covering member, said rear inner solid core member being comprised of a molded or extruded plastic member, said rear flexible outer covering member being comprised of a textured synthetic material available in a plurality of colors, said synthetic material being waterproof, said rear bumper extension member being configured for removable attachment with the rear bumper of an existing motor vehicle via a rear attachment means, said rear attachment means being comprised of hooks, clamps, and hook and loop fasteners;

a rear wing member, said rear wing member having a wing inner solid core member and a wing flexible outer covering member, said wing inner solid core member being comprised of a molded or extruded plastic member, said wing flexible outer covering member being comprised of a textured synthetic material available in a plurality of colors, said synthetic material being waterproof, said rear wing member being configured for removable attachment with the rear upper portion of an existing motor vehicle via a wing attachment means, said wing attachment means being comprised of hooks, clamps, hook and loop fasteners, and strap members;

a gas cap cover member, said gas cap cover member having a cap flexible outer covering and a cap attachment means, said cap flexible outer covering member being comprised of a textured synthetic material available in a plurality of colors, said synthetic material being waterproof; and a side mirror cover member, said mirror cover member having a mirror flexible outer covering and a mirror attachment means, said side flexible outer covering member being comprised of a textured synthetic material available in a plurality of colors, said synthetic material being waterproof.

\* \* \* \* \*